C. Perley.
Naval Ram.
No. 1,880. Reissued Feb. 21, 1865.
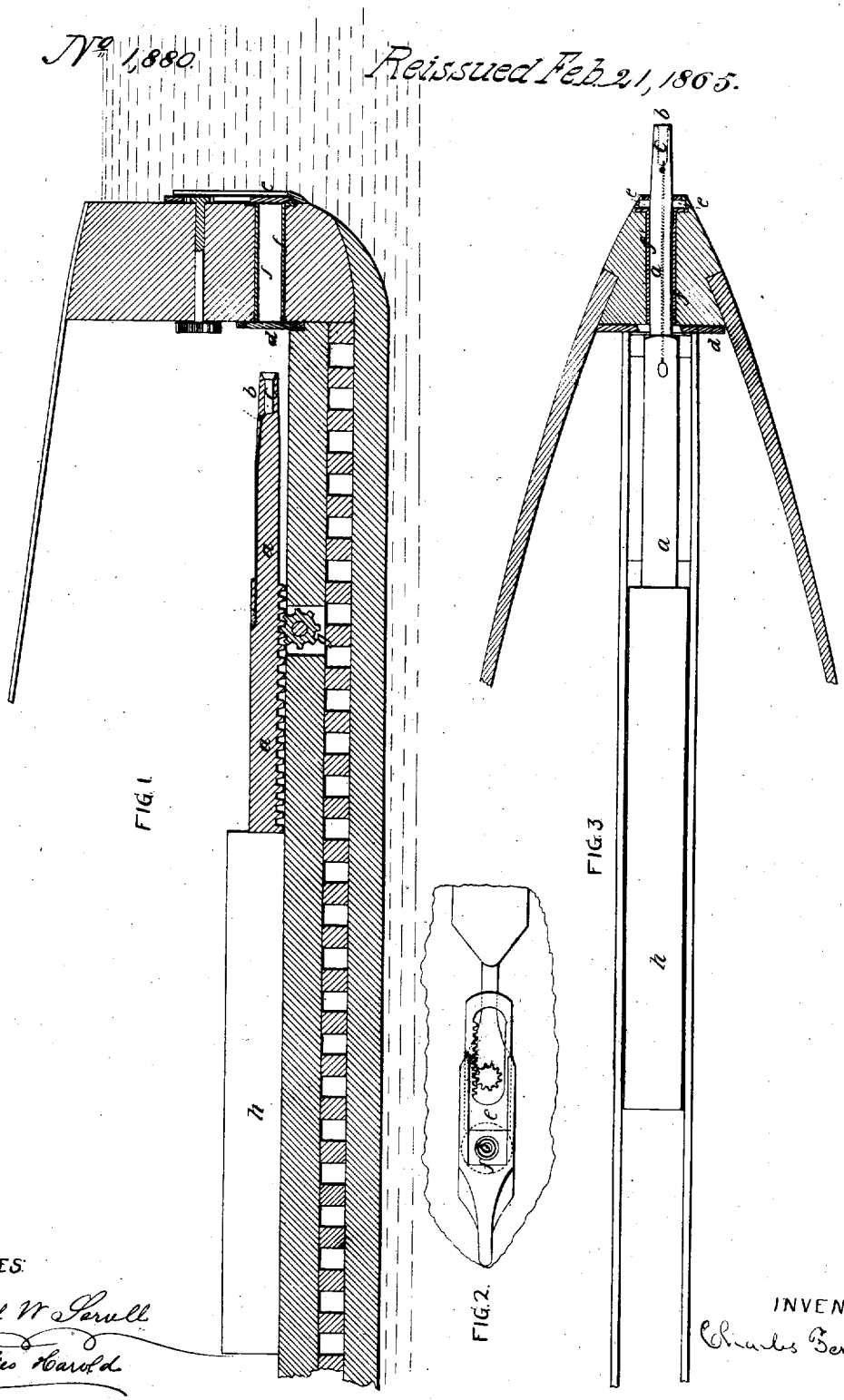
WITNESSES:
Lemuel W. Serrell
Thos. Geo. Harold
INVENTOR
Charles Perley
N. PETERS, PHOTO-LITHOGRAPHER, WASHINGTON, D. C.

UNITED STATES PATENT OFFICE.

CHARLES PERLEY, OF NEW YORK, N. Y.

IMPROVED NAVAL RAM FOR THE DESTRUCTION OF THE ENEMIES' SHIPS.

Specification forming part of Letters Patent No. 37,769, dated February 24, 1863; Reissue No. 1880, dated February 21, 1865.

*To all whom it may concern:*

Be it known that I, CHARLES PERLEY, of the city and State of New York, have invented and made a certain Improvement in Means for Destroying Vessels of War; and I do hereby declare the following to be a full, clear, and exact description of the same, reference being had to the annexed drawings, making a part of this specification, wherein—

Figure 1 is a section of the bows of the vessel with my ram in place for use; and Fig. 2 is an end view of said ram, and Fig. 3. is a plan of the same.

Similar marks of reference denote the same parts.

The nature of my said invention consists in a horn or ram acting under water, and projected through an opening that is closed by gates or a valve when the ram is drawn into the vessel; and I provide a cutting-edge at the end of said ram or horn, to prevent its glancing from an object struck, and I also have a cannon or powder-chamber at the end of said ram or horn, to fire a projectile directly into an opposing vessel.

I employ a horn or bar of suitable material, *a*, say about twenty five feet long, (more or less,) and said bar is located at a suitable distance below the water line to reach the vessel to be destroyed. I have shown an annular cutting-edge upon the end of this shaft, horn, or bar, in order that the same may gouge out and cut away anything it may come in contact with when run into a vessel, and as the part that cuts in and perforates is on the edge, it will not glance off, but will penetrate even when striking at an acute angle. At the end of this shaft or horn a powder-chamber is to be provided when desired. I have represented the same as a cannon, *c*, that may be fired the moment the penetration of the horn into the vessel to be destroyed has taken place, so as to increase the opening for the admission of water, and start the horn back should it become wedged in or entangled.

In order to actuate the horn and to sustain the same, I employ the following device: I introduce an opening at the stem or stern, or both, about five or six feet below the ordinary water-line, and provide a stop-cock or gate, *e*, behind which is a pipe or chamber, *f*, with a stop-cock or gate, *f*, in order that the water may be excluded from the vessel. The horn, ram, or bar *a* should fit the inside of the pipe *f* tightly; or grease or any suitable packing may be employed to keep the vessel from leaking when the horn is protruded, the stop-cocks being opened successively as the horn, bar, or ram is shoved or forced forward. The cannon or chamber at the end of the horn, bar, or ram should be loaded while in the vessel, and the charge and fuze kept water-tight by a coating of tar or similar material. The fuzes, or electrical wire, or other device to fire the powder, should run in a groove planed in the bar, horn, or ram.

The bar, ram, or horn is to be projected out or drawn in by suitable mechanism. I have shown a pinion, *g*, that is to be driven by power, and when projected the ram may be sustained by a heavy pawl or casting introduced behind it, and supported by bracings extended through the vessel, so as to distribute the strain produced by running this horn into a vessel's side below the water-line, and below the plating of iron now usual, or produced by the recoil from an explosion at the end of the horn, ram, or bar. In place of the aforesaid bracing, I however prefer to use a heavy body resting on the keelson as a resistance and relieving the vessel itself from concussion and strain by the sliding thereof on the keelson. This heavy body *h* should be an iron box filled with sections of iron or other ponderous bodies, so as to allow of being moved by detail, if desired. This mass, however, can be run back to allow the horn to be withdrawn after a collision, by the employment of rollers on the keelson, to be raised by eccentrics or otherwise, and the horn and box drawn back by gearing or other means; or the said box may be forced forward to follow up the horn, and afterward allowed to settle down on the keelson by lowering the supporting-rollers. It will be thus evident that the horn, ram, or bar is entirely under control, and can be forced out or drawn in. Besides this, the edge of the horn is such as not to glance off the part struck, and the explosion of the cannon will complete the perforation and destruction of the vessel, and the blow itself is due to the inertia of the mass contained in the vessel instead of the vessel itself, thus relieving the same from strain.

A vessel constructed as aforesaid can go from place to place among a fleet, preforming its work of destruction with comparative ease.

When not in use, the horn or ram is drawn back entirely out of the way.

What I claim, and desire to secure by Letters Patent, is—

1. In combination with a horn or ram capable of being projected from or drawn into a vessel below the water-line, a valve gate or gates to close the orifice when the ram is removed, as specified.

2. A cutting-edge provided at the end of a horn or ram to prevent the same glancing off when striking diagonally against an opposing vessel, as set forth.

3. In combination with a movable horn or ram a weight or mass of material employed behind said horn or ram, but seperate from the vessel itself, and acting to drive the horn into the vessel to be destroyed, substantially as set forth.

In witness whereof I have hereunto set my signature this 14th day of November, 1864.

CHARLES PERLEY.

Witnesses:

LEMUEL W. SERRELL,
CHAS. H. SMITH.